UNITED STATES PATENT OFFICE 2,209,291

RUST REMOVING COMPOSITION

George Witty, Long Island City, N. Y., assignor, by mesne assignments, to Frederick Le Pan, Hartsdale, N. Y.

No Drawing. Continuation of application Serial No. 140,707, May 4, 1937. This application November 23, 1938, Serial No. 241,955

2 Claims. (Cl. 148—8)

My invention relates to a new and useful composition for removing rust, scale, grease, oil and other foreign matter from metal surfaces and at the same time will deposit a protective film which will prevent any new formation of corrosion and forming a bond for the finishing coats; such as galvanizing, plating, painting, enameling or lacquering.

In the art of pickling, the metal is treated with a diluted acid to remove oxides such as rust, scale and other foreign matter, after which the metal is preferably washed with water or dipped into an alkaline solution to remove the last trace of free acid. The acid removes the rust and scale, but unfortunately, from the pickling standpoint, unless some agent to prevent such action is present it attacks the clean metal itself, thereby causing loss of metal, embrittlement, pitting, discoloration, and producing an evolution of hydrogen gas, which escapes into the air, carrying with it a fine spray of the acid liquor from the pickling bath and creating an atmosphere possessing corrosive properties and one which is injurious to health and damaging to equipments.

There are great differences, between the hardness, brittleness, weight, tensile strength and other physical and chemical properties of the various metals, and in order to produce an efficient and economical rust removing and rust preventing compound and to eliminate the present difficulties, the following must be taken in consideration.

(1) The physical and chemical properties of the various metals.

(2) A solvent so balanced that it will remove the rust and prevent any further formation of the same.

(3) The properties of the solvent must be capable of removing rust or any other deposit without attacking the metal.

(4) To eliminate harmful fumes so it can be handled without risk or danger.

(5) The most suitable temperature must be maintained to facilitate the function of the solvent.

The object of my invention is to provide a rust removing and rust preventing medium, chemically balanced, that will economically and in a single operation, remove rust, scale, oil, grease and other deposits from the metal surfaces, without attacking the clean metal.

Another object of my invention is to provide a rust removing and rust preventing compound which will minimize the amount of metal lost in cleaning or pickling operation, which will increase the efficiency of the pickling operation, and which will facilitate the cleaning or de-rusting operation without producing an atmosphere possessing corrosive properties which are injurious to the health of workmen, and damaging to the equipments.

A further object of my invention is to remove rust, scale, oil, grease and materials that cause corrosion in a simple and effective manner so that when the work is completed the metal will be in condition suitable for receiving a protective coating such as galvanizing, plating, painting, enameling or the like.

My improved composition is made from a liquid mixture of the following ingredients that are preferably used in the following proportions:

| | Parts |
|---|---|
| Anhydrous phosphoric acid | 36 |
| Zinc phosphate | 3 |
| Gum arabic | 2 |
| Manganese chloride | 1 |
| Butyl propionate | 30 |
| Water | 28 |

All parts are by weight.

In preparing the composition, the anhydrous phosphoric acid and zinc phosphate are intermixed in an acid-proof tank with the butyl propionate to form a first batch. The gum arabic and manganese chloride are placed in a mixing machine of any suitable type and dissolved in the water to form a second batch. The mixture is stirred until the gum arabic and the manganese chloride are thoroughly dissolved in the water.

The two batches are then thoroughly intermixed until a homogeneous mass is formed. In some cases, additional water is added.

The composition may be applied to the metal surface by dipping, brushing, or spraying, after which the treated surface is washed with clean water and it is then ready to receive the finishing coat or coats.

While I have described in detail the preferred ingredients and proportions thereof, and also the preferred manner of compounding the ingredients so as to secure the most satisfactory composition for the purpose. It is to be understood however, that the specific disclosure is for the purpose of exemplification and that my invention in its broader aspect is not limited either to the particular ingredients, proportions or method of compounding specifically described but equivalent materials may be used, and the proportions and the method of compounding may be varied without departing from the scope of the invention.

The anhydrous phosphoric acid (phosphorous pentoxide) combines with the water to form phosphoric acid, and phosphoric acid may be used directly. The butyl propionate is an organic solvent for fats, greases, oils, etc., and it may be replaced by methyl alcohol, ethyl alcohol, and other solvents of oils, fats, and greases. The gum arabic produces an emulsion of the insoluble ingredients, and it may emulsify the dissolved oil, fat and grease. When a film of the liquid is applied to the metal surface, the gum arabic maintains the film in continuous form on the metal surface. Otherwise, the liquid would form separate drops on the metal surface. Other substances could be used instead of the gum arabic. For example, it is well known that soap lowers the surface tension of water.

The zinc phosphate and the manganese chloride act as buffers when the phosphoric acid passivates the iron, steel and other metal surface. The invention is particularly useful in treating iron and its alloys, such as steel, etc.

It will be noted that the composition is free from any acid which is stronger than phosphoric acid. Such stronger acids include nitric acid, hydrochloric acid, and sulphuric acid.

The zinc phosphate is insoluble in water, but it is soluble in phosphoric acid.

This application is a continuation of my former application, Serial No. 140,707, filed May 4, 1937, forfeited March 1, 1938.

Since zinc is more electropositive than iron, I prefer to use a zinc salt in the composition, when it is used for cleansing and rust-proofing iron. The zinc phosphate is the tribasic salt $Zn_3(PO_4)_2.4H_2O$.

Having described my invention, I claim:

1. A rust removing composition, comprising phosphoric acid, zinc phosphate, gum arabic, manganese chloride, butyl propionate and water.

2. A rust removing composition, comprising phosphoric acid 36 parts, zinc phosphate 3 parts, gum arabic 2 parts, manganese chloride 1 part, butyl propionate 30 parts and water 28 parts, said proportions being by weight.

GEORGE WITTY.